US011196866B1

United States Patent
Samat et al.

(10) Patent No.: US 11,196,866 B1
(45) Date of Patent: Dec. 7, 2021

(54) APPARATUSES AND METHODS INVOLVING A CONTACT CENTER VIRTUAL AGENT

(71) Applicant: 8x8, Inc., Campbell, CA (US)

(72) Inventors: Arunim Samat, Campbell, CA (US); Vijai Gandikota, Campbell, CA (US); Manu Mukerji, Campbell, CA (US); Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 65 days.

(21) Appl. No.: 16/822,739

(22) Filed: Mar. 18, 2020

Related U.S. Application Data

(60) Provisional application No. 62/820,160, filed on Mar. 18, 2019.

(51) Int. Cl.
*H04M 3/42* (2006.01)
*H04M 3/523* (2006.01)
*H04M 3/51* (2006.01)
*H04L 12/58* (2006.01)

(52) U.S. Cl.
CPC ........ *H04M 3/5233* (2013.01); *H04L 51/046* (2013.01); *H04M 3/5175* (2013.01); *H04M 3/5191* (2013.01); *H04M 3/5237* (2013.01); *H04M 2201/42* (2013.01); *H04M 2203/402* (2013.01)

(58) Field of Classification Search
CPC ............. H04M 3/5233; H04M 3/5175; H04M 3/5191; H04M 3/5237; H04M 2201/42; H04M 2203/402; H04L 15/046
USPC ......... 379/265.01–265.1, 266.01–266.1, 309
See application file for complete search history.

(56) References Cited

U.S. PATENT DOCUMENTS

| | | | |
|---|---|---|---|
| 6,061,433 | A | 5/2000 | Polcyn et al. |
| 7,065,188 | B1 | 6/2006 | Mei et al. |
| 7,369,653 | B2 | 5/2008 | Dezonno et al. |
| 7,979,840 | B2 | 7/2011 | Zhang et al. |
| 7,983,401 | B1 | 7/2011 | Krinsky |
| 8,316,347 | B2 | 11/2012 | Arsanjani et al. |

(Continued)

OTHER PUBLICATIONS

The Examiner is respectfully referred to concurrently-filed patent prosecution of the common Applicant, U.S. Appl. No. 16/822,760; U.S. Appl. No. 16/822,760; and U.S. Appl. No. 16/822,760.

*Primary Examiner* — William J Deane, Jr.
(74) *Attorney, Agent, or Firm* — Crawford Maunu PLLC

(57) ABSTRACT

Apparatuses and methods concerning providing a data-communications contact center virtual agent are disclosed. As an example, user-data-communications between client and participant stations are facilitated as follows, which may be implemented using a data communications server and associated communications circuitry. Service request data is received from users at a participant stations, and context information is identified for user-data-communications between a client station and the participant stations based on the service request data at least one communications-specific characteristic associated with the user-data-communications. The identified context information is aggregated for the client station and used for choosing a data routing option routing data with each user at the participant stations, based on the service request data and the aggregated context information.

15 Claims, 4 Drawing Sheets

(56) References Cited

U.S. PATENT DOCUMENTS

| | | |
|---|---|---|
| 8,332,813 B2 | 12/2012 | Arasanjani et al. |
| 8,411,842 B1 * | 4/2013 | Wu .................... H04M 3/5233 |
| | | 379/265.11 |
| 8,468,244 B2 | 6/2013 | Redlich |
| 8,739,111 B2 | 5/2014 | Allam et al. |
| 8,750,123 B1 | 6/2014 | Alisaw et al. |
| 8,874,755 B1 | 10/2014 | Deklich et al. |
| 9,077,746 B2 | 7/2015 | Chandrshekhar |
| 9,171,319 B2 | 10/2015 | Qu et al. |
| 9,213,564 B1 | 12/2015 | Klein et al. |
| 9,392,049 B2 | 7/2016 | Ennis et al. |
| 9,542,832 B1 | 1/2017 | Fu et al. |
| 9,552,512 B2 | 1/2017 | Guo et al. |
| 9,717,017 B2 | 7/2017 | Backholm et al. |
| 10,021,590 B2 | 7/2018 | Backholm et al. |
| 10,027,803 B2 | 7/2018 | Krinsky et al. |
| 10,096,063 B2 | 10/2018 | Dahlwadkar |
| 10,282,791 B2 | 5/2019 | O'Neil |
| 10,394,975 B2 | 8/2019 | Kim et al. |
| 10,433,243 B2 | 10/2019 | Lopes et al. |
| 10,573,312 B1 | 2/2020 | Thomson |
| 10,666,799 B2 | 5/2020 | Kazerani et al. |
| 10,944,800 B1 | 3/2021 | Arsanjani et al. |
| 10,949,619 B1 | 3/2021 | Arsanjani et al. |
| 11,025,488 B1 | 6/2021 | Arsanjani et al. |
| 2003/0187868 A1 | 10/2003 | Igarashi |
| 2004/0064517 A1 | 4/2004 | Uenoyama et al. |
| 2004/0122245 A1 | 6/2004 | Franks |
| 2005/0152511 A1 | 7/2005 | Stubley |
| 2008/0027784 A1 | 1/2008 | Ang et al. |
| 2008/0140348 A1 | 6/2008 | Frank |
| 2008/0214219 A1 | 9/2008 | Matsushima |
| 2009/0083768 A1 | 3/2009 | Hatalkar et al. |
| 2009/0254572 A1 | 10/2009 | Redlich et al. |
| 2009/0327172 A1 | 12/2009 | Liu et al. |
| 2010/0226490 A1 * | 9/2010 | Schultz ................ H04M 3/523 |
| | | 379/265.09 |
| 2010/0250497 A1 | 9/2010 | Redlich et al. |
| 2014/0012826 A1 | 1/2014 | Wisman et al. |
| 2014/0064072 A1 | 3/2014 | Ludwig |
| 2014/0064202 A1 | 3/2014 | Norstrom et al. |
| 2014/0120981 A1 | 5/2014 | King et al. |
| 2014/0244652 A1 | 8/2014 | O'Neil |
| 2015/0242513 A1 | 8/2015 | Sanghavi et al. |
| 2015/0243155 A1 | 8/2015 | Xiong et al. |
| 2015/0256676 A1 * | 9/2015 | Famous ............ H04M 3/42068 |
| | | 379/265.09 |
| 2015/0294377 A1 | 10/2015 | Chow |
| 2015/0363563 A1 | 12/2015 | Hallwachs |
| 2016/0036869 A1 | 2/2016 | Logan et al. |
| 2016/0080428 A1 | 3/2016 | Fan et al. |
| 2016/0080570 A1 * | 3/2016 | O'Connor ........... H04M 3/5133 |
| | | 379/265.09 |
| 2016/0100053 A1 * | 4/2016 | Wong .................... H04M 3/436 |
| | | 379/201.02 |
| 2016/0188960 A1 | 6/2016 | Guo et al. |
| 2016/0227431 A1 | 8/2016 | Alisaw |
| 2016/0350674 A1 | 12/2016 | Midboe |
| 2016/0360039 A1 | 12/2016 | Sanghavi et al. |
| 2016/0364488 A1 | 12/2016 | Shen et al. |
| 2017/0104876 A1 | 4/2017 | Hibbard et al. |
| 2017/0236148 A1 | 8/2017 | James et al. |
| 2017/0257303 A1 | 9/2017 | Boyapalle et al. |
| 2017/0262164 A1 | 9/2017 | Jain et al. |
| 2017/0264743 A1 * | 9/2017 | Kocan ................ H04L 65/1096 |
| 2018/0032576 A1 | 2/2018 | Romero |
| 2018/0041378 A1 | 2/2018 | Yan et al. |
| 2018/0047072 A1 | 2/2018 | Chow |
| 2018/0054524 A1 | 2/2018 | Dahan et al. |
| 2018/0176281 A1 | 6/2018 | Arunachalam et al. |
| 2018/0184140 A1 | 6/2018 | Danker et al. |
| 2018/0184171 A1 | 6/2018 | Danker et al. |
| 2018/0309708 A1 | 10/2018 | Potvin |
| 2018/0324041 A1 | 11/2018 | Deklich et al. |
| 2019/0012251 A1 | 1/2019 | Khosrowpour et al. |
| 2019/0042988 A1 | 2/2019 | Brown et al. |
| 2019/0243836 A1 | 8/2019 | Nanda et al. |
| 2019/0253520 A1 | 8/2019 | Maharana et al. |
| 2019/0327130 A1 | 10/2019 | Huang et al. |
| 2019/0342718 A1 | 11/2019 | Pylappan et al. |
| 2019/0349426 A1 | 11/2019 | Smith et al. |
| 2020/0092293 A1 | 3/2020 | Liu et al. |
| 2020/0133629 A1 | 4/2020 | Pratt et al. |

* cited by examiner

APPARATUSES AND METHODS INVOLVING A CONTACT CENTER VIRTUAL AGENT

OVERVIEW

Various example embodiments are directed to apparatuses, systems, methods of use, methods of making, or materials, such as those described in the claims, description or figures herein, all of which form part of this patent document.

In accordance with various aspects of the disclosure, a data-communications contact center virtual agent apparatus includes communications circuitry configured to communicate with respective stations, and a data communications server configured and arranged with the communications circuitry to facilitate communications as follows. User-data-communications between a client station and participant stations are processed, with the stations participating in data-communications via the client station, and with the client station being associated with a client entity. Input service request data is obtained from users at the participant stations. Context information is identified for each respective user-data-communication between the client station and the participating stations based on the service request data at least one communications-specific characteristic associated with the user-data-communications, and the identified context information is aggregated for the client station. For a user-data-communication from one of the participant stations, a data communications routing option is chosen for routing data with the one of the participant stations based on the service request data and the aggregated context information, and data communications are routed with the one of the participant stations in accordance with the chosen data communications routing option.

Various embodiments are directed to addressing challenges relating to aggregating information from a plurality of data-communications systems to provide a contact center virtual agent. Accordingly, various embodiments are directed to a variety of apparatuses, methods, components and/or related systems comprising or related to providing a contact center virtual agent, including a data-communications server configured and arranged to process user-data communications between a client station and another station participating in data communications via the data-communications services. In such example embodiments, the client station is associated with one client entity, and the data-communications server may identify a context (e.g., criticality and sentiment) for each respective user-data communication between the client station and the participating station, where the context corresponds to at least one communications-specific characteristic associated with the user-data communications. In such embodiments, the data-communications server may learn from frequently asked questions and answer inquiries from another user without the involvement of a live agent, and provide a data-communications virtual assistant based on the identified context and frequently asked questions, and answer inquiries from another user.

Certain embodiments involve apparatuses, methods, systems, circuitries, and the like as described in the following description, figures, and/or claims.

BRIEF DESCRIPTION OF FIGURES

Various example embodiments may be more completely understood in consideration of the following detailed description in connection with the accompanying drawings, in which.

Figure 1:
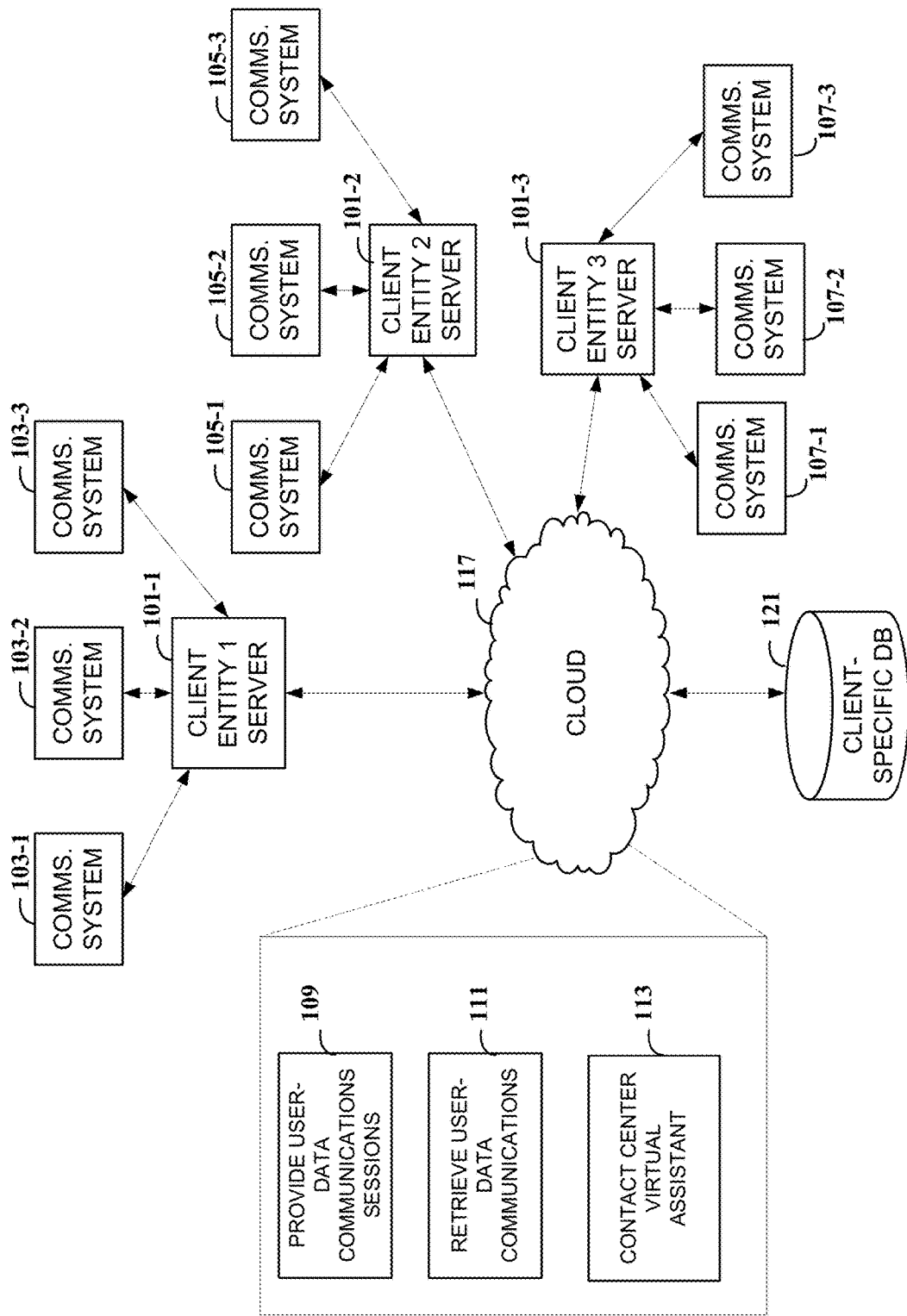
FIG. 1 illustrates a block diagram of an example system for a contact center virtual agent, consistent with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving providing a contact center virtual agent. In certain implementations, aspects of the present disclosure have been shown to be beneficial when used in the context of providing data-communications services. While the present disclosure is not necessarily limited to such data-communications systems as described herein, for purposes of facilitating understanding and appreciation of certain embodiments, the following discussion uses such data-communications-based services and systems in the context and on behalf of communications platforms of client entities which subscribe to such services from a data-communications service provider (with a server).

Embodiments are directed toward apparatuses and methods for use in communications systems employing a data-communications server operated by a communications provider, where the data-communications server is on the data-communications provider side, to provide data-communications services to a multitude of client entities. For instance, the data-communications server may provide data-communications sessions each involving a client-specific endpoint device and another participating endpoint device, where the client-specific endpoint device is associated with a client-entity among the plurality of remotely-situated client entities. In such contexts, the data-communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data-communications session may include transmission and receipt of data-communications between at least two endpoint devices, as hosted (e.g., provided) by the data-communications server.

In a non-limiting example embodiment, the data-communications server may identify a context (e.g., criticality and sentiment) for each respective user-data-communication between the client station and the participating station, where the context corresponds to at least one communications-specific characteristic associated with the user-data-communications. Additionally, the data-communications server may learn from frequently asked questions and answer inquiries from another user without the involvement of a live agent, and provide a contact center virtual agent based on the identified context and frequently asked questions and answer inquiries from another user. As another illustration, the data-communications server may identify the context of the communication and skills associated with a particular agent, and match an incoming communication with a particular agent based on the identified skills and the context of the communication.

Additionally and/or alternatively, the data-communications server may integrate an intelligent contact center to provide call deflection and real time agent assistance. For instance, provide recommendations to the agent during the communication based on the identified context. The data-communications server may, via the contact center virtual agent, provide recommendations to the agent during the communication as a visual indicator on a graphical user interface (GUI), based on the identified context. In some example embodiments, the data-communications server can provide recommendations to the agent during the communication as an auditory instruction, based on the identified context. For instance, the data-communications server may identify the context of the communication during the communication, and provide recommendations to the agent regarding how to address the particular communication. The data-communications server may, via the contact center virtual agent, provide recommendations on the particular answer for the communication, individuals and/or groups to route the particular communication. Similarly, the data-communications server may, via the contact center virtual agent, identify in real time, a topic of the communication and feed the identified topic into the contact center virtual agent for real time recommendations on handling the communication.

In various example embodiments, the contact center virtual assistant may provide call deflection and real time agent assistance. The contact center virtual assistant can implement a dual flow live agent assist, and act as a session initiation protocol (SIP) gateway by routing calls to a dialog flow, translating the SIP communication into a remote procedure call (such as GRPC) and back to SIP. The contact center virtual assistant may plug in multiple speech to text (STT) or text to speech (TTS) modules, and rate the accuracy of the translated language. Moreover, the data-communications server, via the contact center virtual assistant, may identify topics in real time, and feed the identified topics into a multivalue database (such as a QM™ product).

In additional non-limiting embodiments, the data-communications server may implement, via the contact center virtual assistant, a knowledgebase classifier capable of taking a question that a caller has asked and identify one and only one answer. As such, the contact center virtual assistant may collect question and answer pairs from support websites, cluster the question and answer pairs to remove related ones, and use some distance metrics to determine distance between user query and questions. The data-communications server may use, via the contact center virtual assistant, a defined threshold to match question and answer pairs to the user query, and/or to provide the particular answer to an agent for live assistance, as described herein.

In accordance with various aspects of the disclosure, an apparatus facilitates a data-communications contact center virtual agent. The apparatus includes communications circuitry that communicates with respective stations, and a data communications server that operates with the communications circuitry to process user-data-communications between a client station and participant stations. The stations participate in data-communications via the client station, which is associated with a client entity, and input service request data is obtained from users at the participant stations. Context information is identified for user-data-communications between the client station and the participating stations, based on the service request data at least one communications-specific characteristic associated with the user-data-communications. For instance, context information may relate to user input specifying an issue, question or other need to be serviced and other information relating to the instant or other user data communications involving the user and/or other users. The identified context information is aggregated for the client station, and can be used in a variety of manners. For instance, in a user-data-communication from one of the participant stations, a data communications routing option may be chosen for routing data with the one of the participant stations based on the service request data and the aggregated context information. Data communications may then be routed with the one of the participant stations in accordance with the chosen data communications routing option.

Routing data, such as by routing a voice connection, text data, or image data may be effected in a variety of manners. In certain implementations, the data communications routing option may be chosen using a predefined communication for routing to the participant station in response the service request data specifying a question (e.g., where the question may be associated with a type or group of questions or topics). Accordingly, the data communications may be routed in accordance with the chosen data communications routing option by routing data that provides a response to the question.

In some embodiments, the routing option is chosen selecting an agent based on the service request data characterized the identified context information, and communications are routed between the one of the participant stations and the selected agent in accordance with the chosen data communications routing option. Context may be learned from a particular user station via which the routing is effected, or from a variety of user stations that may or may not be related. For instance, the agent may be selected based the context information for the user-data-communications with a plurality of the other participant stations, which may facilitate identifying a particular agent that/who has addressed a particular question or topic. In certain implementations, historical context information is aggregated for a plurality of agents to facilitate characterization of each agent's skills, and an agent may be selected based on such aggregated historical context information (e.g., relative to other agents).

The routing option may also be chosen based on a question and learned context information for a particular user posing the question. For instance, an agent may be selected for routing based on the service request data and data associated with a user at the participant station, as characterized in the identified context information. Data communications can thus be routed between the participant station and the selected agent.

In certain more particular implementations, data is routed between a user and an agent that is selected based on user input, context information for the user providing the input, and the agent's skills. For instance, the agent may be selected from a plurality of agents based on capabilities of the agents and aspects of the context data characterizing the service request data, as well as data associated with the user at the participant station via which the request is generated. Data communications can then be routed accordingly, between the one of the participant stations and the selected agent in accordance with the chosen data communications routing option. Capabilities of the agents may be defined based on aspects of the context information corresponding to previously routed data communications with the agents.

Context information may be identified in a variety of manners. For instance, data characterizing historical interactions with a particular user at a participant station may be used to identify the context information for a current communication involving that user. Context information may be identified, for instance, based upon a topic of communication identified in real time, from a participant station for which routing is effected. Identified context information may be aggregated for previous communications from a user at the one of the participant stations. For example, when a user contacts a help center to address an issue (e.g., a computer software problem), context information for the associated communication can be stored. When that user contacts the help center again, the stored context information from the previous communication (or multiple such communications) can be aggregated and utilized in choosing the data communications routing option.

In certain embodiments involving data communications routing to agents, capabilities of respective agents with which the data communications are routed may be characterized based on aspects of the context information corresponding to previously routed data communications with the agents. User data communications that designate a particular one of the agents may be deflected to another one of the agents, based on the characterized capabilities of the agents.

In certain embodiments, agents are selected and connected with a user at the participant station for routing based on an identified context as characterized herein, with the context being further used to provide recommendations to the selected agent during the data communications. For instance, where a context may relate to a certain topic, recommendations corresponding to the topic may be provided to the selected agent. Such recommendations may be provided to the selected agent as a visual indicator on a graphical user interface and/or as auditory instruction.

The embodiments and specific applications discussed herein may be implemented in connection with one or more of the above-described aspects, embodiments and implementations, as well as with those shown in the figures, which are fully incorporated herein by reference.

Turning now to the figures, FIG. 1 illustrates a block diagram of an example system for providing a contact center virtual assistant, consistent with the present disclosure. Data-communications services may be provided for a plurality of client entities, such as via a data-center communications server. Each client entity may provide the data-communications services to various endpoint devices, as may be implemented in a distributed computing environment. For instance, as illustrated in FIG. 1, a data-center communications server may host via cloud 117. A plurality of client entities may access the data-center communications server via the cloud 117, such as by a respective client entity server (e.g., client entity 1 server 101-1, client entity 2 server 101-2, and client entity 3 server 101-3).

Each of the respective client entities may be connected in one or more data networks as discussed further herein. Moreover, each of the respective client entity servers 101-1, 101-2, and 101-3 may be communicatively coupled to a plurality of communications systems. For example, client entity 1 server 101-1 may be communicatively coupled to communications systems 103-1, 103-2, and 103-3. Similarly, client entity 2 server 101-2 may be communicatively coupled to communications systems 105-1, 105-2, and 105-3. Further, client entity 3 server 101-3 may be communicatively coupled to communications systems 107-1, 107-2, and 107-3.

Although not illustrated in FIG. 1, each of the client entity servers may be communicatively coupled to a number of endpoint devices. The endpoint devices may include data-communications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data-communications server. Registered devices for each client account can be listed in a respective account settings file (not shown) stored by a data-center communications server.

The system illustrated in FIG. 1 further includes one or more processing circuits configured to implement client-specific control engines, which are configured to adjust the data-communications provided for each client account according to a respective set of control directives. For instance, the client-specific control engines may adjust a manner in which endpoint devices are controlled, and/or a manner of routing of a data-communications for a client account, by accessing client-specific sets of control data stored in at least one client-specific database 121.

The server-based communications system illustrated in FIG. 1 may facilitate providing a contact center virtual assistant, consistent with the present disclosure. In various exemplary embodiments, a contact center virtual assistant may be provided by a data-center communications server. Additionally and/or alternatively, a contact center virtual assistant may be provided by a client-managed server. In either situation, at 109, user-data communications sessions each involving a client-specific endpoint device and another participating endpoint device may be provided, where the client-specific endpoint device is associated with a client-entity among a plurality of remotely-situated client entities each respectively configured and arranged to interface with the data-communications server. For instance, the data-communications server may provide to each of client entity 1, client entity 2, and client entity 3, data-communications services as described herein. Subsequently, at 111, user-data communications between the client entity and the other party may be retrieved from a plurality of interconnected data-communications systems for a first time period. A context may be determined for each respective user-data communication between the client entity and the other party during the first time period, as described herein. The identification of the context of communications during the first time period may assist with the development of the client-specific database 121, and enable machine learning to assign a context to subsequent user-data-communications. As such, a plurality of user-data communications between the client entity and the other party may be aggregated.

At 113, a contact center virtual assistant may be provided. The data-communications virtual assistant may be provided based on the aggregated context information, and may apply call routing based on the identified topic context (e.g., criticality and sentiment). As described herein, a context may represent an overall sentiment of a relationship between at least two parties. The context may be identified based on a number of factors, including keyword, phrase, and/or tone, and may be identified from a single user-data-communication between the parties and/or from an aggregate of user-data-communications between the parties. In embodiments where the context is determined from an aggregate of user-data-communications, projections and/or predictions may be made as to the likely future context between the parties. Additionally and/or alternatively, the context may be displayed for each disparate data-communications system, allowing the viewer to assess the context between the two parties in differing communications platforms. The data-communications server may, via the contact center virtual assistant, implement a knowledgebase classifier capable of taking a question that a caller has asked and identify one and only one answer. As such, the contact center virtual assistant may collect question and answer pairs from support websites, cluster the question and answer pairs to remove related ones, and use some distance metric to determine distance between user query and questions. The data-communications server may use, via the contact center virtual assistant, a defined threshold to match question and answer pairs to the user query, and/or to provide the particular answer to an agent for live assistance, as described herein.

Figure 2:
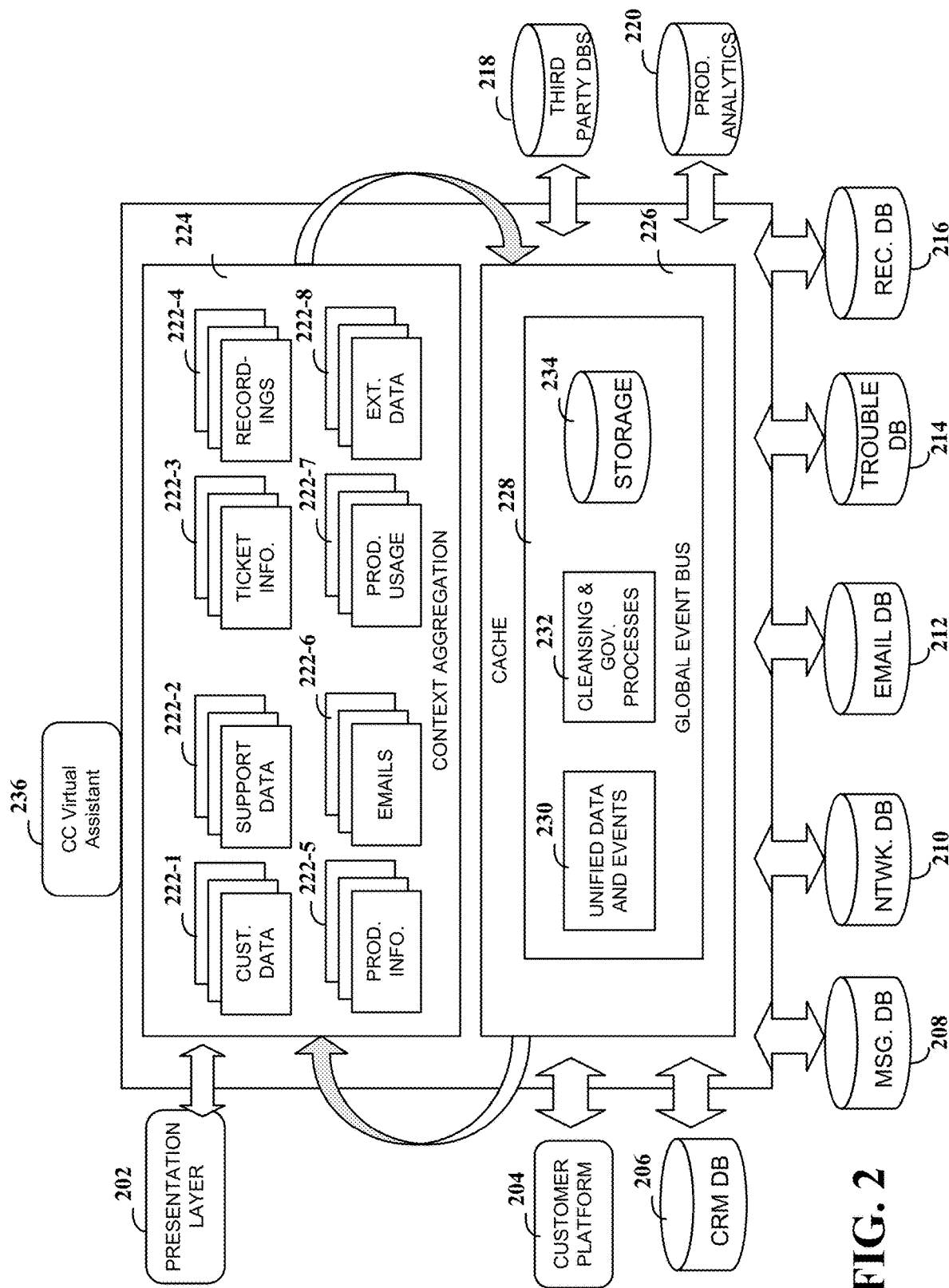
FIG. 2 illustrates a block diagram of an example system of intelligence for a contact center virtual agent, consistent with the present disclosure.

FIG. 2 illustrates a block diagram of an example system of intelligence for providing a contact center virtual assistant, consistent with the present disclosure. The system of intelligence illustrated in FIG. 2 may be implemented by a data-center communications server hosted by a communications service provider, and/or by a client-managed server hosted by a client of the communications service provider.

As discussed with regards to FIG. 1, each client entity may be associated with a plurality of interconnected data-communications systems. For instance, each client entity may be associated with a CRM system, an email communication system, a product sales system, a text-based communications system (e.g., chat), a technological support system, and/or a data monitoring system. Examples are not so limited, and each client entity may be associated with additional and/or different communications systems beyond those listed. Additionally, the client entity and/or the communications service provider may be communicatively coupled to external (e.g., third party) systems and/or databases.

Referring to FIG. 2, a data cache 226 may store real-time information about all interactions involving the client entity (including the other party). For instance, a global event bus 228, stored in cache 226, may identify and record each interaction and/or event involving the client entity. A unified data and events circuit 230 may store the various data and events involving the client entity, such as emails sent and received, phone calls placed and received, chat messages, etc. A cleansing and governance processes circuit 232 may process the unified data and events as appropriate based on the content of the data. For instance, different encryption and/or data handling processes may be implemented for data and events including health data and/or financial data. A storage circuit 234 may store the various events, information regarding cleansing and governance processes, and other information.

In response to an event occurrence, such as transmission or receipt of a user-data communication, the cache 226 may be updated. Particularly, the cache 226 may be updated to include an updated context based on the aggregated communications between the client entity and the other party. For instance, the cache 226 may be communicatively coupled to a plurality of databases, including a customer platform database 204, a CRM database 206, a messaging database 208, a networking or developmental operations database 210, an email database 212, a troubleshooting database 214, a recordings database 216, a product analytics and usage database 220, and third party databases 218, among others. Data and/or information pertaining to a particular user may be retrieved from each of these databases, and stored for context aggregation, such as by a context aggregation circuit 224. As an illustration, to determine a context between User 1 and Company 1, information pertaining to customer sales and billing for User 1 may be retrieved from the CRM database 206, service tickets may be retrieved from troubleshooting database 214, and transcripts of voice calls may be retrieved from the recordings database 216. Similarly, to determine a context between User 2 and Company 1, information pertaining to customer sales and billing for User 2 may be retrieved from the CRM database 206, service tickets may be retrieved from troubleshooting database 214, and transcripts of voice calls may be retrieved from the recordings database 216.

In various embodiments, data and/or information from each respective database may be stored in the context aggregation circuit 224. For instance, customer data 222-1 from the customer platform 204, support data 222-2 from the network database 210, message transcripts (not illustrated in FIG. 2) from the message database 208, product information 222-5 from the CRM database 206, and emails 222-6 from the email database 212 may be stored in the context aggregation circuit 224. Additionally, service ticket information 222-3 from the troubleshooting database 214, recordings and/or transcripts from the recordings database 216, product usage and analytics 222-7 from the product analytics database 220, and external data 222-8 from third party databases 218 may be stored in the context aggregation circuit 224.

Each time that an event occurs involving the client entity and the other party, the cache 226 and context aggregation circuit 224 may be updated. In various example embodiments, a presentation layer 202 may present the contact center virtual assistant in various formats. For example, circuitry configured and arranged to communicate with the system of intelligence illustrated in FIG. 2 (e.g., the cache 226 and the context aggregation circuit 224) may present a graphical user interface on a desktop computing device, mobile computing device, and/or tablet, which visually presents the context between the client entity and the other party. The presentation layer 202 may further facilitate the presentation of the contact center virtual assistant 236, as identified with regards to FIG. 1.

Figure 3:
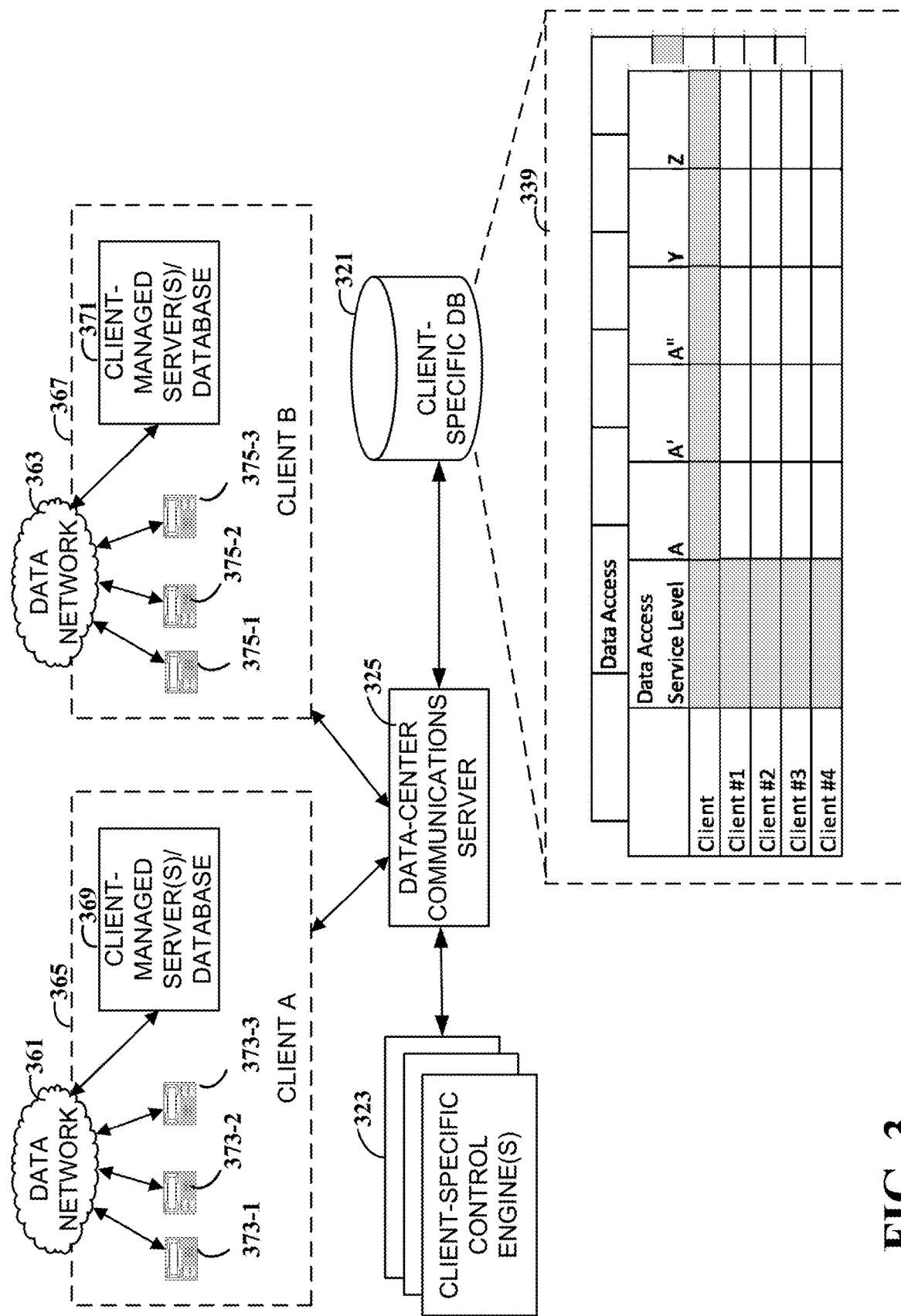
FIG. 3 illustrates a block diagram of an example data communications system for a contact center virtual agent, consistent with the present disclosure.

FIG. 3 illustrates a block diagram of an example data-communications system for client-specific data-communications monitoring, consistent with the present disclosure. The system includes a data-center communications server 325 configured to provide data-communications for a plurality of endpoint devices 373-1, 373-2, 373-3, 375-1, 375-2, 375-3 connected in one or more data networks 361 and 363. The endpoint devices may include data-communications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device may be respectively associated with an account of a respective client. Endpoint devices may be associated with a particular client account by registering the endpoint device with a particular client account serviced by the data-communications server. Registered devices for each client account may be listed in a respective account settings file (not shown) stored by the data-center communications server 325. In this example, endpoint devices 373-1, 373-2, and 373-3 are associated with an account 365 for a first client A and endpoint devices 375-1, 375-2, and 375-3 are associated with an account 367 for a second client B.

The system includes one or more processing circuits configured to implement client-specific control engines 323, which may be configured to adjust the data-communications provided for each client account according to a respective set of control directives. For instance, the client-specific control engines 323 may adjust a manner in which endpoint devices 373-1, 373-2, 373-3, 375-1, 375-2, and 375-3 are controlled, and/or a manner of routing of a data-communications for a client account, by generating client-specific sets of control data to the data-center communications server 325. For example, the client-specific control engines 323 may generate client-specific sets of control data by processing the respective set of control directives for the account in response to communication event data or other data prompts received from the data-center communications server 325.

As previously described, client-specific control engines 323 may be used to facilitate control of endpoint devices associated with a client device. The control of the endpoint devices may be associated with a variety of virtual office features including, for example, data-communications services such as voice over Internet Protocol (VoIP) calls, audio and/or video conferencing, internet protocol private branch exchange (IP PBX) servers, packet switching, and traffic management as well as non-data communications services including, but not limited to, website hosting, remote data storage, remote computing services, virtual computing environments. One or more of such virtual office features may be provided, for example, by a cloud-computing network having one or more servers configurable to provide a data communications system for a plurality of clients.

Each respective client entity may have a client-managed server and/or database. For instance, client A 365 may be associated with a client-managed server or database 369, whereas client B 367 may be associated with a client managed server or database 371. The client-managed server may facilitate the routing of data-communications between the respective endpoint devices and the data-center communications server. Similarly, the client-managed servers may analyze, in some example embodiments, the sentiment and criticality of communications sent to and/or received by the respective endpoint devices, as discussed herein. In some example embodiments, each respective client entity may have a database storing client-specific preferences correlating different sentiment scores and criticality scores with different handling processes.

Additionally and/or alternatively, the data-center communications server 325 may be communicatively coupled with a client specific database 321, storing service level subscriptions 339 for each of a plurality of client entities. For example, the data-communications service provider may provide a plurality of different service levels for the clients. Each disparate service level may provide additional services and/or information to the client entity, relative to past communications handled and subsequent communications to be handled by the service provider. For example, Client A 365 and Client B 367 may be associated with a home improvement store and an adhesives manufacturer, respectively. Service level A, which can be offered to both Client A and Client B, may be associated with routing communications for Client A and Client B, and also providing information to the clients regarding customer purchase data. The purchase data may include information about how many products were purchased, when they were purchased, which products were associated with problems and/or an increased number of customer complaints, and the like. Similarly, a second service level (e.g., service level A') may include the services of the first service level (e.g., service level A) but also information on venue and regional demographics. For instance, Service level A', which may be offered to both Client A and Client B, may be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") may include the services of service level A' but also information on venue and relative pricing grouping. For instance, service level A", which can be offered to both Client A and Client B, can be associated with routing communications for Client A and Client B, providing information to the clients regarding customer purchase data, providing information about demographic populations, and information regarding relative prices which each demographic population may be willing to spend. Additional service levels (e.g., service level Y and service level Z illustrated in FIG. 2) may be specified. Each respective client entity (e.g., client #1 through client #4) may have a specified level of data service access provided by the data-center communications server 325.

Figure 4:
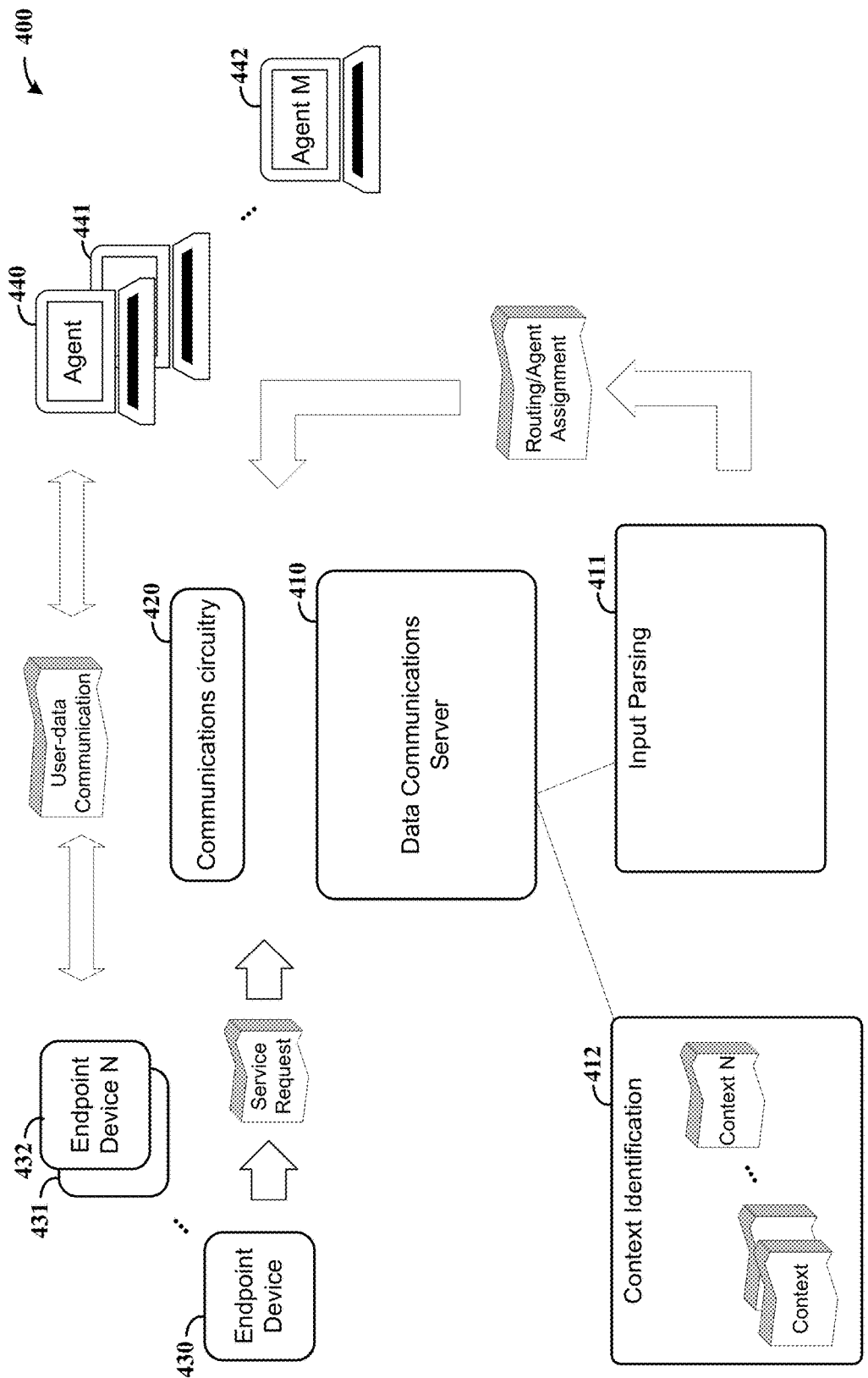
FIG. 4 shows an apparatus and approach for user-data communications routing, as an effective virtual agent, as may be implemented in a manner consistent with the present disclosure.

FIG. 4 shows an apparatus 400 and approach for user-data communications routing, which may effect a contact center virtual agent, and which may be further implemented in accordance with one or more embodiments. Such approaches may provide automated routing and connection decisions based on identified context information as well as input from users for which data communications are being routed. The apparatus 400 includes a data communications server 410 and communications circuitry 420 that communicate with respective stations, including endpoint devices 430-432 (or "N" such devices) and agent devices 440-442 (or "M" such devices). In this context, each agent device may be part of a common client station, such as for agents representing a client entity. Each agent device as shown may represent a separate client station, which may have one or more agents therein. Different ones of the agent devices may also be grouped as a particular client (and, e.g., effectively act as a client station). The data communications server 410 operates to process user-data-communications between a client station (e.g., agent 440) and participant stations (e.g., 430-432) that participate in data communications via the client station.

Service request data sent from users at the endpoint devices 430-432 is parsed by the data communications server 410, at block 411, and context information is identified at block 412 based on the service request data and one or more communications-specific characteristics associated with the user-data-communications. The identified context information may be aggregated for the client station and stored, such as by aggregating information over time for various communications from a particular user and/or from groups (or all) users involving the client station.

A data communications routing option is chosen for routing data (e.g., for each service request) involving one of the participant stations based on the service request data and the aggregated context information. The routing option may involve, for example, selection of a particular endpoint device or agent device via which the user can be serviced, such as by selecting an agent for providing service to the user from which the service request emanates. Data communications, such as voice, text, media, or a combination thereof, are routed in accordance with the chosen data communications routing option.

Certain embodiments are directed to the creation of one or more documents that characterize users, which may utilize communication stations for involvement with related communications (e.g., as depicted in FIG. 4). Such documents may include data useful for identifying a context involving the particular user, and can provide data characterizing historical interactions that can be used for identifying context for a current communication and/or for predicting context. This may relate to system users looking for help or other input, or to agents who serve system users by providing feedback and/or other resources.

Various blocks, modules or other circuits can be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer-processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus that refers to or includes otherwise known circuit-based structures. As a first example, a (data-communications) endpoint device (or endpoint) refers to or includes a communications circuit such as one enabled to communicate over a broadband network such as the Internet or a cellular communications network (e.g., computer) processing circuits as configured to establish data-communications sessions with other endpoint devices and such endpoints include, e.g., personal computers, IP-enabled mobile phones, and tablet computers. In addition, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed:

1. A data-communications contact center virtual agent apparatus, comprising:

communications circuitry configured to communicate with respective stations; and a data communications server configured and arranged with the communications circuitry to:

process user-data-communications between a client station and participant stations participating in data-communications via the client station, where the client station is associated with a client entity;

obtain input service request data from users at the participant stations;

identify context information for each respective user-data-communication between the client station and the participating stations based on the service request data and at least one communications-specific characteristic associated with the user-data-communications; and aggregate the identified context information for the client station; and for a user-data-communication from one of the participant stations, choose a data communications routing option for routing data with the one of the participant stations based on the service request data and the aggregated context information, and route data communications with the one of the participant stations in accordance with the chosen data communications routing option.

2. The apparatus of claim 1, wherein the data communications server is configured and arranged to:
choose the data communications routing option for routing data with the one of the participant stations by choosing a predefined communication for routing to the participant station in response the service request data specifying a question, and
route the data communications with the one of the participant stations in accordance with the chosen data communications routing option by routing data that provides a response to the question.

3. The apparatus of claim 1, wherein the data communications server is configured and arranged to
choose the data communications routing option for routing data with the one of the participant stations by selecting an agent based on the service request data characterizing the identified context information, and
route data communications between the one of the participant stations and the selected agent in accordance with the chosen data communications routing option.

4. The apparatus of claim 3, wherein the data communications server is configured and arranged to choose the data communications routing option for routing data with the one of the participant stations by selecting the agent based the context information for the user-data-communications with a plurality of the other participant stations.

5. The apparatus of claim 3, wherein the data communications server is configured and arranged to:
aggregate historical context information for a plurality of agents, including said agent, therein providing a characterization of each agent's skills; and
select the agent based on the aggregated historical context information for the plurality of agents.

6. The apparatus of claim 1, wherein the data communications server is configured and arranged to
choose the data communications routing option for routing data with the one of the participant stations by selecting an agent based on the service request data and based on data associated with a user at the participant station as characterized in the identified context information, and
route data communications between the one of the participant stations and the selected agent in accordance with the chosen data communications routing option.

7. The apparatus of claim 1, wherein the data communications server is configured and arranged to:
choose the data communications routing option for routing data with the one of the participant stations by selecting an agent from a plurality of agents, based on capabilities of the agents and aspects of the context data characterizing the service request data and data associated with a user at the participant station, and
route data communications between the one of the participant stations and the selected agent in accordance with the chosen data communications routing option.

8. The apparatus of claim 7, wherein the data communications server is configured and arranged to define the capabilities of the agents based on aspects of the context information corresponding to previously-routed data communications with the agents.

9. The apparatus of claim 1, wherein identifying the context information includes using data characterizing historical interactions with a user at the participant station to identify the context information for a current communication.

10. The apparatus of claim 1, wherein the data communications server is configured and arranged to:
characterize capabilities of respective agents with which the data communications are routed, based on aspects of the context information corresponding to previously-routed data communications with the agents; and
deflect user-data communications, which designate a particular one of the agents, to another one of the agents, based on the characterized capabilities of the agents.

11. The apparatus of claim 1, wherein the data communications server is configured and arranged to choose the data communications routing option for routing data with the one of the participant stations by selecting an agent from a plurality of agents and connecting the selected agent with a user at the participant station, and to provide recommendations to the selected agent during the communication based on the identified context.

12. The apparatus of claim 11, wherein the data communications server is configured and arranged to provide the recommendations to the selected agent as a visual indicator on a graphical user interface.

13. The apparatus of claim 11, wherein the data communications server is configured and arranged to provide the recommendations to the agent as an auditory instruction.

14. The apparatus of claim 1, wherein the data communications server is configured and arranged to identify the context information based further upon a topic of communication from the participant station identified in real time.

15. The apparatus of claim 1, wherein the data communications server is configured and arranged to aggregate the identified context information by aggregating identified context information for previous communications from a user at the one of the participant stations, and to choose the data communications routing option based on the aggregated context information for the user.

* * * * *